United States Patent [19]

Pagan

[11] Patent Number: 4,783,291
[45] Date of Patent: Nov. 8, 1988

[54] METHOD AND APPARATUS FOR FOAM EXTRUSION INTO A VACUUM CHAMBER HAVING A LIQUID BAFFLE WITH CONTROL OF THE LIQUID LEVEL

[75] Inventor: Rafael Pagan, Seven Hills, Ohio

[73] Assignee: U.C. Industries, Inc., Parsippany, N.J.

[21] Appl. No.: 80,680

[22] Filed: Aug. 3, 1987

[51] Int. Cl.$^4$ .................. B29C 67/22; B29C 47/92
[52] U.S. Cl. .................... 264/40.4; 264/51; 264/101; 264/178 R; 425/71; 425/147; 425/817 C
[58] Field of Search .............. 264/51, 53, 40.4, 101, 264/178 R; 425/71, 147, 817 C

[56] References Cited

U.S. PATENT DOCUMENTS 3,704,083 11/1972 Phipps .......................... 425/4 X
4,044,084 8/1977 Phipps .......................... 264/51

Primary Examiner—Philip Anderson
Attorney, Agent, or Firm—Renner, Otto, Boisselle & Sklar

[57] ABSTRACT

A foam extrusion system and method employs a horizontal vacuum chamber with a bulkhead and extrusion die at one end of the chamber, the extrusion die being inside the chamber when the bulkhead is closed. A liquid baffle, preferably water, is provided at the opposite end of the chamber through which the extrudate passes from the chamber to atmosphere. The baffle comprises a pond of liquid having a higher level in the chamber and a lower level outside the chamber. The higher level of the pond is formed between a dam plate and a seal plate, the latter forming the opposite end of the chamber. The seal plate includes a size adjustable window through which the extrudate passes, the extrudate being guided by a conveyor to extend inclined downwardly into the pond and to exit through the seal plate and pond with a large radius upwardly curved section. The level of liquid in the chamber is controlled by circulating liquid from the higher level of the pond within the chamber to the lower level of the pond outside the chamber with the amount of liquid circulated being inversely proportional to the absolute pressure in the vacuum chamber. Optionally the circulated liquid may pass through a cooler to control the liquid temperature. The size adjustment of the window or exit orifice in the seal plate may be used to control the flow of liquid from the lower level pond portion outside the chamber to the higher level pond portion inside the chamber, particularly during start up.

24 Claims, 1 Drawing Sheet

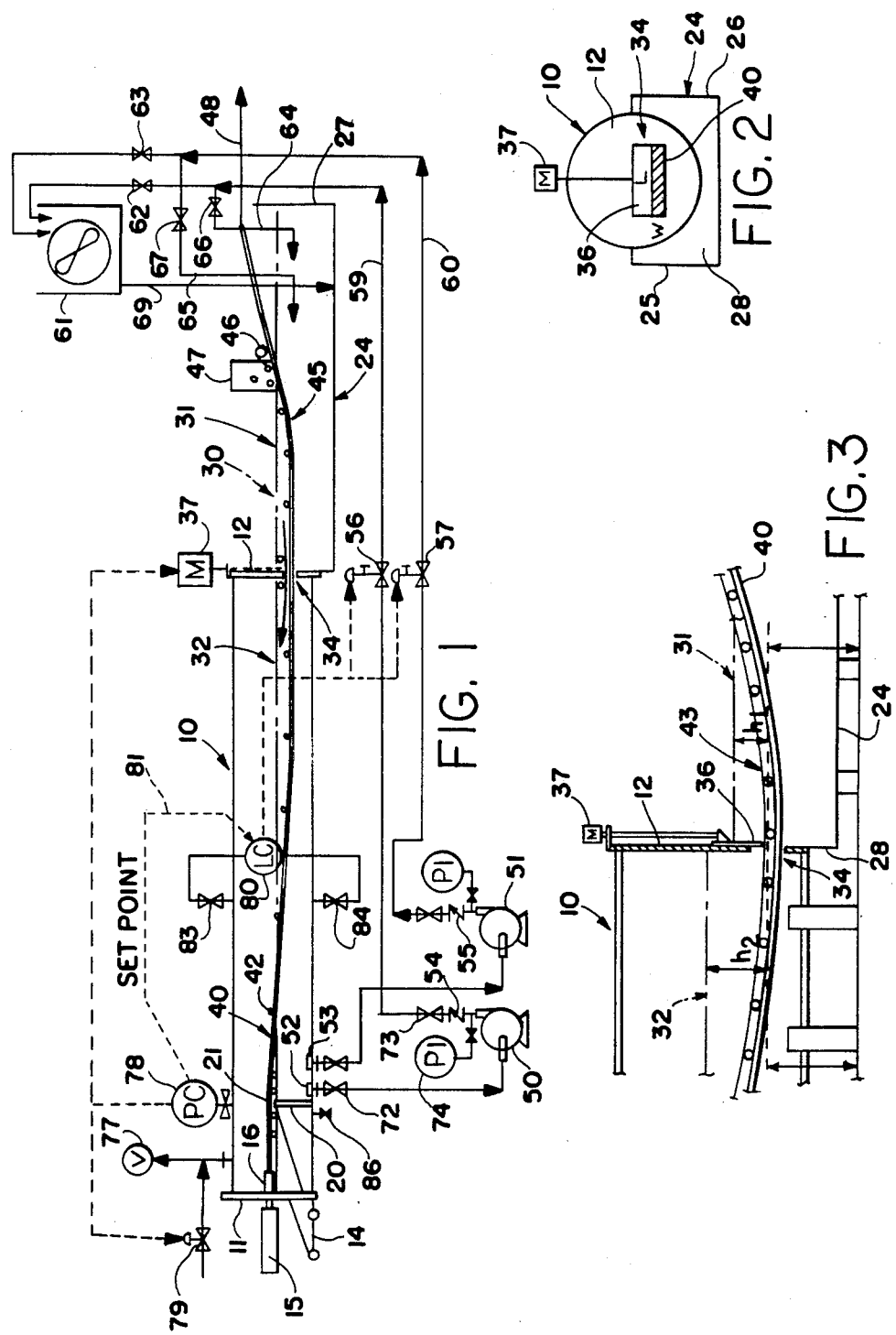

METHOD AND APPARATUS FOR FOAM EXTRUSION INTO A VACUUM CHAMBER HAVING A LIQUID BAFFLE WITH CONTROL OF THE LIQUID LEVEL

DISCLOSURE

This invention relates generally as indicated to a foam extrusion apparatus and method, and more particularly one such method and apparatus utilizing a large vacuum chamber.

BACKGROUND OF THE INVENTION

It has been shown that extrusion of foamable plastic into a vacuum chamber will produce a high quality low density foam, such as the foam products sold under the trademark FOAMULAR by U.C. Industries of Parsippany, N.J. Such products are produced commercially by extruding the plastic melt into an inclined barometric leg which is in the form of a large diameter pipe which forms a vacuum chamber. The lower end of the pipe which is of substantial length projects into a pond of liquid preferably water. When the chamber is under vacuum the water is drawn from the pond at least partially to fill the chamber. The water serves to seal the chamber and cool the extrudate. The inclined configuration permits the extrudate to be extracted from the chamber on a continuous basis with the aid of a belt conveyor. Examples of such installations may be seen in the following U.S. Pat. Nos. 3,704,083; 4,044,084; 4,199,310; 4,234,529; 4,247,276; and 4,271,107.

One of the principal problems of the inclined barometric leg installations such as shown in such patents is the cost of construction. Because of the length of the leg or chamber and its inclination, the die end where the extruders are located must be at a substantial elevation above the exit or pond end. Such difference in elevation not only creates construction problems but also material handling problems during operation.

Attempts have been made to employ a horizontally extending vacuum chamber and reference may be had to U.S. Pat. Nos. 4,487,731 and 4,486,369 for an illustration of horizontal chamber vacuum extrusion systems. As seen such systems avoid a liquid pond or baffle but instead use an exit chamber which must be cycled from atmospheric to vacuum. Also the extrudate must be cut and/or stacked within the chamber which makes service and control of such equipment difficult. Also spray cooling of the product within the chamber may be inadequate for a large cross sectional size extrudate.

Other types of vacuum extrusion apparatus may be seen in U.S. Pat. Nos. 3,822,331; 1,990,434; and 2,987,768, but such are obviously not suitable for continuous foam extrusion, particularly extrudates of large cross sectional size.

It is accordingly desirble to employ a horizontal chamber which nonetheless utilizes a water baffle or seal in which the extrudate is immersed as it exits the vacuum chamber.

SUMMARY OF THE INVENTION

A foam extrusion system and method employs a horizontal vacuum chamber with a bulkhead and extrusion die at one end of the chamber, the extrusion die being inside the chamber when the bulkhead is closed. A liquid baffle, preferably water, is provided at the opposite end of the chamber through which the extrudate passes from the chamber to atmosphere. The baffle comprises a pond of liquid having a higher level in the chamber and a lower level outside the chamber. The higher level of the pond is formed between a dam plate and a seal plate, the latter forming the opposite end of the chamber. The seal plate includes a side adjustable window through which the extrudate passes, the extrudate being guided by a conveyor to extend inclined downwardly into the pond and to exit through the seal plate and pond with a large radius upwardly curved section. The level of liquid in the chamber is controlled by circulating liquid from the higher level of the pond within the chamber to the lower level of the pond outside the chamber with the amount of liquid circulated being inversely proportional to the absolute pressure in the vacuum chamber. Optionally the circulated liquid may pass through a cooler to control the liquid temperature. The size adjustment of the window or exit orifice in the seal plate may be used to control the flow of liquid from the lower level pond portion outside the chamber to higher level pond portion inside the chamber, particularly during start up.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a side elevation of a vacuum foam extrusion system in accordance with the present invention with the liquid circulation and level controls shown schematically;

FIG. 2 is a front view of the seal plate showing the variable gate through which the submerged extrudate passes; and FIG. 3 is a somewhat enlarged side elevation of the system at the seal plate separating the two levels of the liquid pond.

DETAILED DESCRIPTION OF THE PREFERRED EMBODIMENTS

Referring first to FIG. 1 there is illustrated a large elongated horizontally extending vacuum chamber 10 which includes a bulkhead 11 at one end and a seal plate 12 at the opposite end. The chamber is substantially elongated and is horizontal throughout its length and is in the form of a large diameter pipe. The chamber may be formed of interconnected and sealed large diameter concrete pipe sections such as shown in prior U.S. Pat. No. 4,199,310.

The bulkhead 11 may be mounted for movement on a carriage indicated generally at 14 for movement toward and away from the end of the vacuum chamber 10. On the exterior of the bulkhead there is provided one or more extruders indicated at 15 while the extrusion die is on the interior of the bulkhead as seen at 16. Also mounted on the interior of the bulkhead are shaping rolls to control the configuration and shape of the extrudate exiting the die. For more detail as to the configuration of the shaping rolls and the manner of mounting both the die and shaping rolls on the bulkhead, reference may be had to prior U.S. Pat. Nos. 4,234,529; 4,247,276 and 4,469,652. In any event the vacuum chamber may be opened and closed by moving the bulkhead 11 horizontally toward and away from the end of the chamber.

Positioned in the chamber fairly close to the bulkhead 11 is a dam plate 20, the upper edge 21 of which extends somewhat above a horizontal centerline of the chamber.

Positioned outside the chamber beyond the seal plate 12 is a containment structure 24 which includes side walls 25 and 26 and an end wall 27 remote from the chamber 10. The opposite end wall of the containment structure indicated at 28 includes the seal plate 12.

The containment structure together with the vacuum chamber forms a containment for a pond shown generally at 30 of liquid, preferably water, extending from the dam plate to the containment structure plate 27. As indicated, a portion 31 of the pond is outside the vacuum chamber 10 while a portion 32 is inside the vacuum chamber. Such portions are of course on opposite sides of the seal plate and communication between such portions is obtained by a window illustrated generally at 34 in seal plate 12. A vertically movable gate 36 mounted on the seal plate and driven vertically by motor 37 controls the size of the opening of window 34.

The foam extrudate shown generally at 40 leaves the die 16 to expand and be shaped and then passes under the end 42 or tail pulley of a conveyor belt 43 which is inclined downwardly to bring the extrudate below the level of the pond in the vacuum chamber. The foam extrudate will of course float up against the conveyor belt and the speed of the conveyor belt is closely controlled to draw the foam extrudate from the vacuum chamber. The conveyor belt 43 passes through the window 34 and then curves upwardly as indicated at 45 terminating in head pulley 46 driven from drive 47. The curvature of the conveyor belt need not necessarily be uniform but in no case should the curvature be on a radius less than 150 feet. Reference may be had to prior U.S. Pat. Nos. 4,044,084 and 4,199,310 for disclosures of such conveyors used in inclined barometric legs or vacuum chambers. After the extrudate 40 exits the portion 31 of the pond outside of the vacuum chamber it is of course exposed to atmosphere and the extrudate proceeds in the direction of the arrow 48 for subsequent cutting and processing.

When the gate 36 is in its most closed position it provides fairly close clearance for the conveyor 43 and extrudate 40 and acts as a gross flow control valve for water moving from a portion 31 of the pond 30 outside of the chamber to the portion 32 inside the chamber, particularly during start-up.

In order to control the level of the water within the vacuum chamber 10 there is provided two water circulation pumps indicated at 50 and 51 which draw water from the bottom of the vacuum chamber as indicated at 52 and 53, respectively, just inside the dam plate 20. The outlet of the pumps passes through check valves 54 and 55, respectively, and through power operated valves 56 and 57, also respectively. Such power operated valves are in pump outlet lines 59 and 60, respectively, which extend to cooling tower 61 through respective valves 62 and 63. The cooling tower may be bypassed by closing the valves 62 and 63 and causing the water to flow through lines 64 and 65 leading directly into the pool 31 outside of the vacuum chamber. Such lines may also include respective valves 66 and 67 which are opened and closed alternately with valves 62 and 63. Water from the cooling tower 61 returns to the pond 31 through line 69, again outside of the vacuum chamber.

Also, in addition to the outlet check valves 54 and 55 each pump is provided with inlet and outlet shut off valves as seen at 72 and 73 as well as a pressure gauge 74. The pumps may be utilzied concurrently or separately.

Vacuum is established in the vacuum chamber 10 by one or more vacuum pumps indicated at 77. The vacuum level is controlled by vacuum controller 78 through an air bleed valve 79.

The vacuum controller 78 is also electronically connected to both level control 80 and motor 37, the latter controlling the position of gate 36 on the seal plate. The level controller connection is by the set point control connection illustrated at 81.

The level controller 80 is connected to both the vacuum and water sides of the vacuum chamber through the valves indicated at 83 and 84. The level controller in turn controls level control valves 56 and 57 in the pump discharge lines 59 and 60, respectively.

The vacuum chamber just to the inside of the dam plate 20 is provided with a sump and drain indicated at 86 in the event water splashes over the top 21 of the dam plate.

During operation of the system the pumps 50 and 51 function to draw water from the portion 32 of the pond within the vacuum chamber and deliver that water either directly or through the cooling tower to the portion 31 of the pond outside the vacuum chamber or exposed to atmosphere. The water thus flows from one end of the pond to the other and circulates back through the adjustable window in the seal plate 12.

Before vacuum is established in the vacuum chamber the water level on both sides of the seal plate will be at a common level. At this point the pumps 50 and 51 are turned on but the level control valves 56 and 57 are closed. When the vacuum chamber is closed, by moving the bulkhead 11 against the end of the chamber, the vacuum controller 78, being set to a desired level, turns on the vacuum pumps 77. As the vacuum level goes up (absolute pressure goes down) water will of course be drawn from the exterior of the chamber into the interior of the chamber causing the water level on the interior of the chamber to rise. During this process, the level controller begins to open the level control valves 56 and 57 and the vacuum controller begins to close gate 36 through motor 37. The control of the gate 36 reducing the size of the orifice acts as a gross flow control valve for water moving into the vacuum chamber.

Both the vacuum controller 78 and the level controller 80 have optimum adjustable set points. When the vacuum controller 78 reaches its set point, it begins to maintain the desired vacuum level by actuating the bleed valve 79. When the level controller 80 reaches its set point it will begin to modulate the level control valves 56 and 57 maintaining the water level within the vacuum chamber within a given narrow range simply by increasing or decreasing the flow or circulation of water from the vacuum chamber to the atmospheric portion of the pond 31. As the vacuum level increases, the water level inside the vacuum increases and in order to maintain the water level at an acceptable level the water flow through the valves 56 and 57 also increases. During operation of the system the vacuum controller resets the level controller 80 on a continuing basis which in turn modulates the level control valves 56 and 57. In other words, the vacuum controller is the master and the level controller is the slave. By resetting the level controller constantly, the vacuum controller then can anticipate changes in the water level thus maintaining a precise water level inside the vacuum chamber in response to the vacuum level. However, the gate 36, once in its final position, will normally stay in that position and is used as such gross flow control valve only during start up or shut down of the system. In any event the full system permits the water level inside the vacuum chamber to be controlled in response to the vacuum level within the chamber thus obviating the necessity for a long and inclined barometric leg. The system may also operate with less total volume of water.

With the present invention there is provided a foam extrusion line which includes an elongated horizontally extending chamber with the chamber being horizontal throughout its length. The chamber is provided with an extrusion die at one end forming a foam extrudate within the chamber and a water baffle at the opposite end to enable the chamber to be maintained under vacuum. The foam extrudate is guided through the baffle to atmosphere for subsequent cutting and processing. In order to maintain the liquid level within the vacuum the liquid is circulated from the higher level of liquid within the vacuum chamber to the lower level of liquid outside the chamber during extrusion. The amount of liquid circulated is of course inversely proportional to the absolute pressure in the vacuum chamber.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of preparing foam plastic comprising the steps of extruding a foamable plastic melt into a vacuum chamber, passing the foaming extrudate into a body of liquid which is partially within and partially without such chamber to exit the chamber through such body of liquid, and controlling the level of that portion of the body of liquid within such chamber by extracting liquid from that portion of the body of liquid within such chamber.

2. The method of claim 1 including the step of circulating liquid from that portion of the body of liquid within such chamber to that portion without such chamber.

3. The method of claim 2 wherein the amount of liquid circulated is inversely proportional to the absolute pressure within such vacuum chamber.

4. The method as set forth in claim 2 wherein the step of controlling comprises the step of controlling a level control valve in the outlet line of a circulating pump.

5. The method as set forth in claim 4 wherein the level control valve is in turn controlled by a level controller.

6. The method as set forth in claim 5 wherein the level controller is in turn controlled by a vacuum controller.

7. The method as set forth in claim 6 including the step of providing an adjustable gate between that portion of the body of liquid within and without the chamber, and controlling such gate from the vacuum controller.

8. A method of extruding plastic foam comprising the steps of extruding a foamable plastic melt into an elongated vacuum chamber at one end thereof and to exit such chamber through an exit opening in a seal plate at the other end thereof, such exit opening being submerged in a body of liquid partially within and partially without such chamber, and circulating such liquid from within the chamber to without the chamber to cause the liquid to flow inwardly through such exit opening and to maintain the level of liquid within such chamber.

9. A method as set forth in claim 8 including the step of controlling the amount of liquid circulated to control the level of liquid within the chamber.

10. A method as set forth in claim 8 including the step of controlling the size of the exit opening in response to the vacuum level in the chamber.

11. A method as set forth in claim 10 including the step of controlling the size of the exit opening in response to the vacuum level in the chamber.

12. A foam extrusion line comprising a vacuum chamber, a bulkhead plate and extrusion die at one end of said chamber, a liquid baffle at the opposite end of said chamber operative to seal the chamber and through which the extrudate passes from the chamber to atmosphere, said liquid baffle comprising a pond of liquid having a higher level in the chamber and a lower level outside the chamber, and means to circulate liquid from the higher level to the lower level to control such higher level during extrusion.

13. A foam extrusion line as set forth in claim 12 wherein the amount of liquid circulated is inversely proportional to the absolute pressure in the vacuum chamber.

14. A foam extrusion line as set forth in claim 12 including means to guide said extrudate downwardly from an essentially horizontal direction and then upwardly through said liquid baffle.

15. A foam extrusion line as set forth in claim 12 including a dam plate within said chamber and a seal plate at the end of said chamber opposite said die to form the pond of higher level in the chamber.

16. A foam extrusion line as set forth in claim 15 including an exit orifice for the extrudate in said seal plate below the pond level, and means to control the size of said exit orifice.

17. A foam extrusion line as set forth in claim 15 wherein said means to control the size of said exit orifice comprises a motor driven gate on said seal plate.

18. A foam extrusion line comprising an elongated horizontally extending chamber, said chamber being horizontal throughout its length, an extrusion die at one end of said chamber forming a foam extrudate within said chamber, continuously circulating liquid baffle means at the opposite end of said chamber operative to enable said chamber to be maintained under vacuum, and means to guide said extrudate through said baffle means to atmosphere for subsequent cutting and processing.

19. A foam extrusion line as set forth in claim 18 wherein said liquid baffle means comprises a pond of liquid having a higher level in the chamber and a lower level outside the chamber.

20. A foam extrusion line as set forth in claim 19 including means to circulate liquid from the higher level to the lower level during extrusion to maintain the level in the chamber.

21. A foam extrusion line as set forth in claim 20 wherein the amount of liquid circulated is inversely proportional to the absolute pressure in the vacuum chamber.

22. A foam extrusion line as set forth in claim 21 including a dam plate within said chamber and a seal plate at the end of said chamber opposite said die to form the pond of higher level in the chamber.

23. A foam extrusion line as set forth in claim 22 including an exit orifice for the extrudate in said seal plate below the pond level, and means to control the size of said exit orifice.

24. A foam extrusion line as set forth in claim 23 wherein said means to control the size of said exit orifice comprises a motor driven gate on said seal plate.

* * * * *